United States Patent
Völkel

(10) Patent No.: US 6,871,141 B2
(45) Date of Patent: Mar. 22, 2005

(54) VEHICLE NAVIGATION SYSTEM

(75) Inventor: Andreas Völkel, Braunfels (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/841,258

(22) Filed: Apr. 24, 2001

(65) Prior Publication Data

US 2002/0032522 A1 Mar. 14, 2002

(30) Foreign Application Priority Data

Apr. 25, 2000 (EP) .......................................... 00201493

(51) Int. Cl.[7] .............................................. G01C 21/00
(52) U.S. Cl. ..................................... 701/209; 701/200
(58) Field of Search ................................. 701/200, 202, 701/207, 209, 211, 213, 24, 25; 342/357.01, 357.06, 357.08, 357.1; 340/988

(56) References Cited

U.S. PATENT DOCUMENTS

| | | | |
|---|---|---|---|
| 4,799,162 A | * | 1/1989 | Shinkawa et al. .......... 364/436 |
| 6,006,159 A | * | 12/1999 | Schmier et al. ............. 701/200 |
| 6,321,158 B1 | * | 11/2001 | DeLorme et al. ........... 701/201 |

FOREIGN PATENT DOCUMENTS

| | | |
|---|---|---|
| DE | 197 39 094 | 3/1999 |
| DE | 198 28 077 | 12/1999 |
| DE | 198 39 378 | 3/2000 |
| EP | 0 982 700 | 3/2000 |
| FR | 2 726 382 | 5/1996 |

OTHER PUBLICATIONS

European Patent Office Search Report dated Nov. 2, 2000 (2 pages).

* cited by examiner

Primary Examiner—Yonel Beaulieu
(74) Attorney, Agent, or Firm—Mayer, Browm, Rowe & Maw LLP

(57) ABSTRACT

A navigation system is provided with various interlinked facilities, including a user I/O facility, a route planning facility and a position determining facility. In particular, the navigation system is arranged to physically interface to a data communication facility pertaining to organizer device. An embodiment of such system includes the navigation system arranged to signal actual route data to said organizer device for consideration in a preexistent timetable or diary context. Such system is preferably characterized in that said organizer device is arranged to signal actual diary or timetable data to said navigation system for consideration in a preexistent or future route scheme context.

19 Claims, 3 Drawing Sheets

VEHICLE NAVIGATION SYSTEM

FIELD OF THE INVENTION

The present invention relates to a vehicle navigation system provided with various interlinked facilities, including a user I/O facility, a route planning facility and a position determining facility. The invention also relates to a method for operating such a system.

BACKGROUND

Vehicle navigation systems have become widespread. Their purpose is generally to facilitate the planning of a user's itinerary on various levels, such as through geographically selecting an optimum route, through the setting of temporal specifications with respect to various destination locations or categorized activities, to the heuristic solving of the "traveling salesman" problem, and others. Various other functional devices that have been coming into use could amplify the functionalities of the navigation system to an enormous degree. A particular device is the so-called organizer device, that is quite often portable. Some of the associated functions, without limitation, that could be beneficial are the following:

Loading of routes planned earlier from the organizer device into the navigation system;

Loading personal and other names from the organizer into the navigation system that therefrom can complete the necessary data for planning the route, whilst combining and arranging the various destinations according to geographical proximity and other criteria;

Reporting actual arrival times, travel times, and the like to the organizer that can use these for updating its internal organizer data, such as those relating to future appointments; and Warning a user person about a next journey to start, in accordance with appointments that have been made on the level of the organizer.

Physically combining a navigation system with such organizer device will provide for a more efficient coupling and retrocoupling between the various components of the hybridized organization, and therefore raise productivity, as well as allow new and improved results over those of the prior art.

Accordingly, there is a need to physically integrate the functionality of a vehicle navigation system and various functionalities pertaining to the field of office automation, and in particular, the functional features of an organizer device.

Other needs will become apparent upon a further reading of the following detailed description taken in conjunction with the drawings.

SUMMARY OF THE INVENTION

In accordance with the present invention, a vehicle navigation system is provided with various interlinked facilities, including a user I/O facility, a route planning facility and a position determining facility, wherein the navigation system is arranged to physically interface to a data communication facility pertaining to an organizer device.

A preferred embodiment of such system is characterized in that said navigation system is arranged to signal actual route data to said organizer device for consideration in a preexistent timetable or diary context.

Such system is preferably characterized in that said organizer device is arranged to signal actual diary or timetable data to said navigation system for consideration in a preexistent or future route scheme context.

Another preferred embodiment of a comprehensive navigation system with various interlinked facilities, including a user I/O facility, a route planning facility and a position determination facility according to the invention is characterized in that it is physically interfaced to a data communication facility pertaining to an organizer device.

A method for operating a vehicle navigation system provided with various interlinked facilities, including a user I/O facility, a route planning facility and a position determining facility, according to the invention is characterized by physically interfacing the navigation system to a data communication facility pertaining to an organizer device.

These and further aspects and advantages of the invention will be discussed more in detail hereinafter with reference to the disclosure of preferred embodiments, and in particular with reference to the appended Figures.

DETAILED DESCRIPTION

Figure 1:
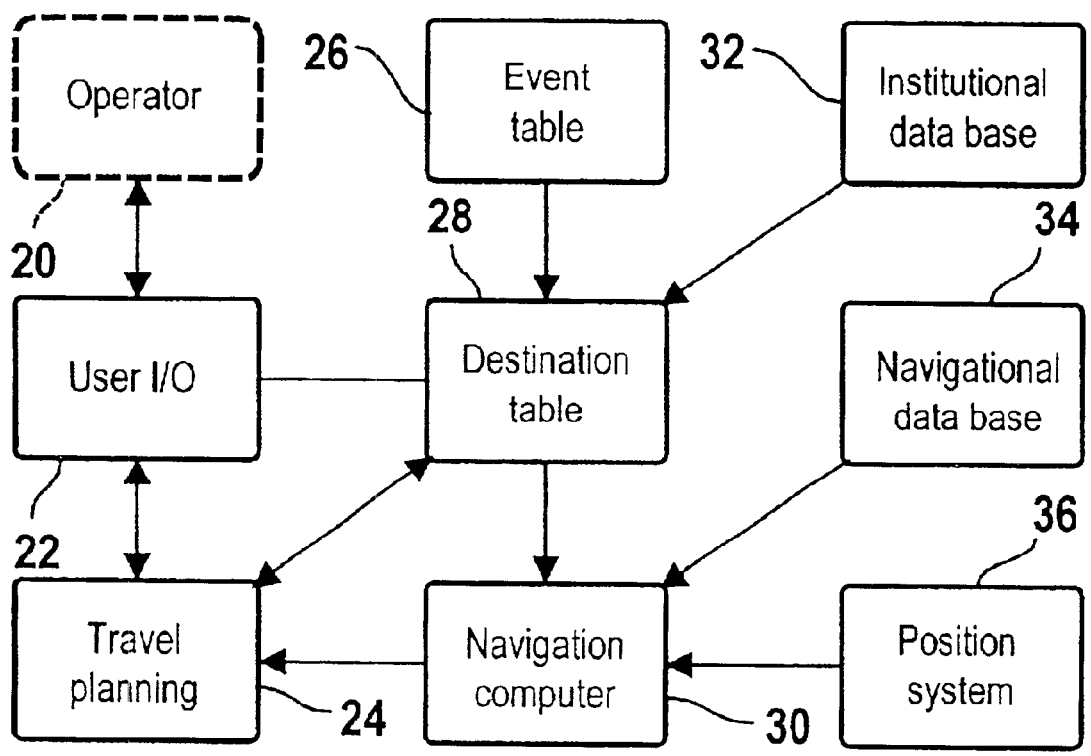
FIG. 1 is an overall diagram of a vehicle navigation system according to the present invention.

While the present invention is capable of embodiment in various forms, there is shown in the drawings and will be hereinafter described a number of presently preferred embodiments with the understanding that the present disclosure is to be considered as an exemplification of the invention, and is not intended to limit the invention to the specific embodiments illustrated in the drawings and described herein.

A principle of the invention is to combine the functionalities of a vehicle navigation system on the one hand, and of an organizer device on the other hand. The latter device may be part of the navigation system itself, or will be able to communicate on an interface that connects the navigation system with the organizer device. For example, the organizer device is provided to load organizer data into the navigation system, and to therefrom receive data for use on the organizer device level.

FIG. 1 shows an overall diagram of a comprehensive navigation system, that by way of example has nine subsystems, as follows. Block 20 symbolizes a user person who wants to be guided by the system. The user interfaces bidirectionally to the system's I/O that may have various hardware and software facilities such as keyboard, mouse, speech, other audio, and display. Block 32 represents an institutional data base that may store various entries, such as representing hotels, restaurants or other facilities, together with associated data such as location, business hours, and actual services present at those facilities. Block 34 represents a navigational data base that may comprise a road network, together with physical distances or travel time distances between representative points, road classifications, and others. Block 36 represents a position system that detects an actual position of the vehicle, such as through using a well known GPS system. Block 26 represents an event table, such as listing a road block or jam situation that has been communicated by a higher level authority such as a Radio Data System, and which event may cause certain destination to be no longer reachable, or only in a delayed manner, or which may necessitate the vehicle to take a detour.

Block 28 represents a destination table that contains the destinations and associated timing indications, such as entered by the user through block 22, and subject to information from the travel planning in block 24, the institutional data base in Block 32, and the event table in block 26. Block 30 represents a navigational computer that is fed with the destination table from block 28, with the navigational data base from block 34, and with the position from block 36. From this information, it can figure out a route to be taken, which route may contain various interval points and furthermore, timing indications associated to the various interval points. Block 24 represents the travel planning that is fed by the information from the navigational computer 30, and which block 24 furthermore bidirectionally interfaces to the destination table in Block 28, and to the User I/O in Block 22. The travel planning will update the destination table if it fails to find a correct solution for attaining all interval points, and it will signal the user what route is to be taken, as well as will signal the above failure to allow the user to modify the set of interval points and/or associated timing indications. Now, although the system depicted in FIG. 1 is fairly comprehensive, a person skilled in the art will recognize that often not all diagram blocks will be necessary in the embodiment of the present invention.

Figure 2:
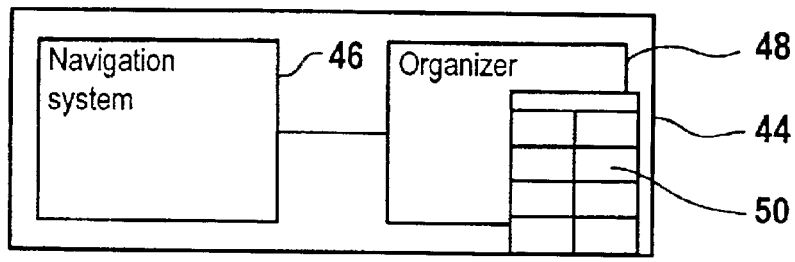
FIG. 2 is an integrated combination of a navigation system and an organizer device.

FIG. 2 shows an integrated combination 44 of a navigation system 46 and an organizer 48. The latter comprises a diary 50 with listed appointments and other time-related data, such as birthdays or holidays. Also, the diary can specify certain destinations that should be visited on particular days or instants. According to a predetermined schedule, such items may be communicated self-reliantly along the connection shown to the navigation system for consideration therein, such as by including them in a journey as destinations, or otherwise.

Figure 3:
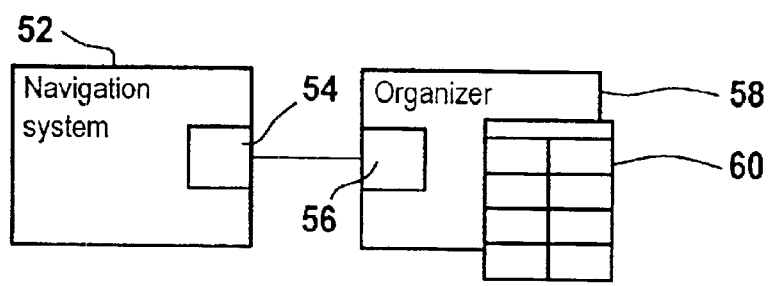
FIG. 3 the same combination as FIG. 2, but is connected through a wired interface.

FIG. 3 shows the same combination 52, 58, 60 interconnected through a wired interface by means of communication modules 54, 56, but not integrated. This configuration allows to unplug the organizer for hand-carrying by a user person, that now need not always be the same, inasmuch as the vehicle and its navigation system may be shared by various persons.

Figure 4:
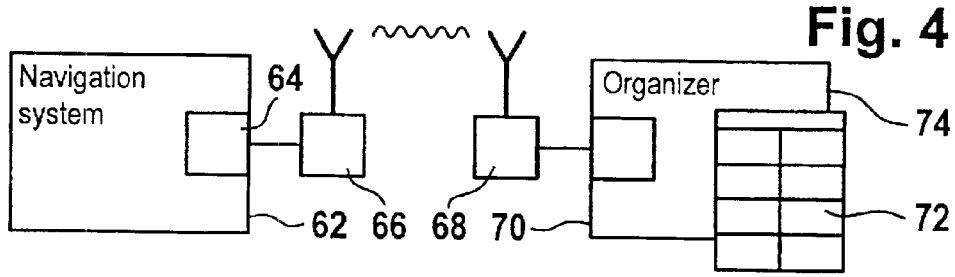
FIG. 4 is the same combination as FIG. 2, but is connected through a broadcast or infrared link.

FIG. 4, shows the same combination 62, 74, 72 interconnected through a wireless communication, by means of transmitter/receiver modules 66, 68. The communication may be effected by infrared IRDA, by the so-called Bluetooth organization, or by another close range link. This allows to undertake the communication under line-of-sight conditions, or in another more or less close geometry. Alternatively, the communication may be effected in the form of further ranging broadcast such as used in the GSM organization.

Figure 5A:
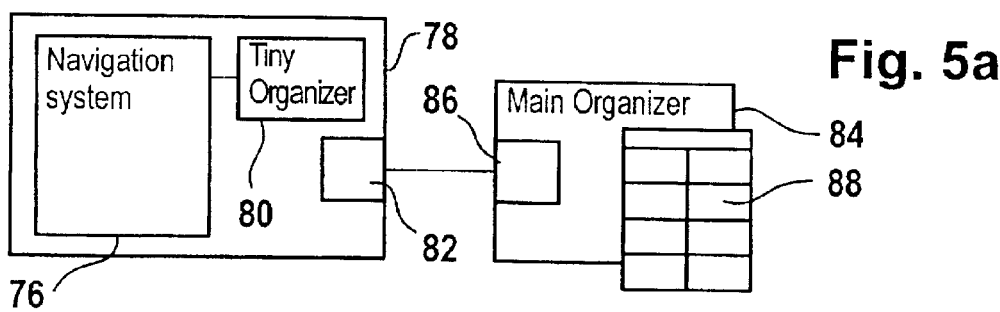
FIGS. 5a and 5b are two configurations that combine aspects of the earlier combinations.
Figure 5B:
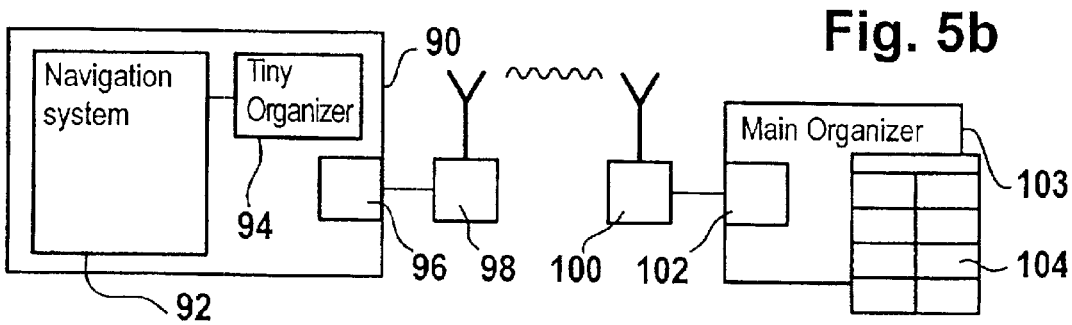

FIGS. 5a, 5b show two configurations through combining aspects of the earlier combinations. In FIG. 5a, the overall system 78, 82, 84, 88 is wired, but the residential module 78 contains both the navigation system 76, the communication module 82, and also an organizer subsystem 80 that represents a part of the overall organizer functionality, such as the diary for only a limited time interval, such the next week. The embodiment of FIG. 5b has similar subsystems 90, 92, 94, 96, 102, 103, 104, combined with the wireless feature of FIG. 4, by means of transmitter/receiver modules 98, 100.

Figure 6:
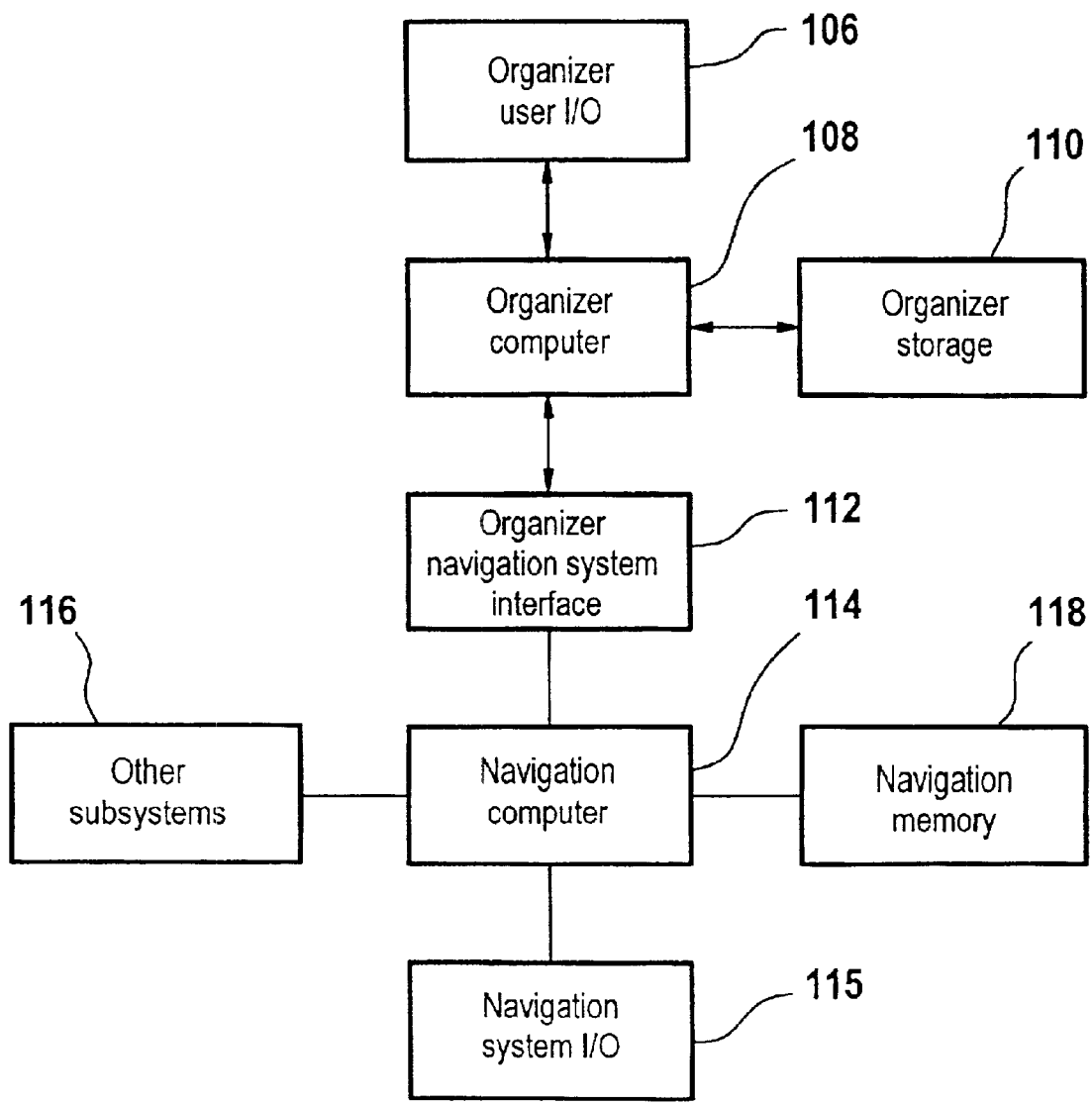
FIG. 6 is a block diagram of an interacting combination of navigation system and organizer.

FIG. 6 shows a block diagram of an interacting combination of a navigation system, and an organizer device, broken up into functional versus communication subsystems. The central navigation system comprises a navigational computer 114, a navigation memory 118, navigation system I/O 115 that in particular comprises the user interface, and other navigation system subsystems 116. The computer, as in FIG. 1, is arranged for route planning, assessing of routes actually taken, checking for problems associated with occurring delays and other problems such as a fuel low. The memory stores the route planned to be taken, the route already accomplished, and various other items, such as the instant when a legally prescribed rest interval must be taken between the driving periods. Block 112 represents the organizer/navigation system interface, that may be activated by either of the two communicating devices, such as based on an interrupt system, or according to periodic pooling, by either of the two parties. Block 108 is the organizer computer that keeps up addresses, appointments, time schedules, and various other items as appropriate. The organizer has a user I/O subsystem 106 and an organizer memory 110.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set below.

What is claimed is:

1. A vehicle navigation system provided with various interlinked facilities, comprising a user I/O facility, a route planning facility and a position determining facility, wherein the navigation system is arranged to interface to a data communication facility pertaining to an organizer device, said organizer device comprising a facility for storing and managing a personal time and place schedule, wherein there is bi-directional communication of system-operational data between said navigation system and said organizer, said bi-directional communication comprising said navigation system being arranged to signal actual route data to said organizer device for consideration in a preexistent timetable or diary context and comprising said organizer device being arranged to signal actual diary or timetable data to said navigation system for consideration in a preexistent or future route scheme context.

2. The navigation system as claimed in claim 1, wherein said navigation system is physically interfaced to said data communication facility of said organizer device.

3. The navigation system as claimed in claim 2, wherein said organizer device is integrated into said navigation system.

4. The navigation system as claimed in claim 2, wherein said organizer device is connected to said navigation system through fixed interconnection means.

5. The navigation system as claimed in claim 2, wherein said organizer device is connected to said navigation system through wireless interconnection means.

6. The navigation system as claimed in claim 2, wherein the organizer device functionality is split into a first part that is integrated into said navigation system, and into a second part that is connected to said navigation system through a linking that is external relative to said navigation system.

7. A method for operating a vehicle navigation system provided with various interlinked facilities, including a user I/O facility, a route planning facility and a position determining facility, comprising interfacing the navigation system to a data communication facility pertaining to an organizer device, said organizer device comprising a facility for storing and managing a personal time and place schedule, wherein there is bi-directional communication of system-operational data between said navigation system and said organizer, said bi-directional communication comprising said navigation system being arranged to signal actual route data to said organizer device for consideration in a preexistent timetable or diary context and comprising said organizer device being arranged to signal actual diary or timetable data to said navigation system for consideration in a preexistent or future route scheme context.

8. A vehicle navigation system comprising a user I/O facility, a route planning facility, and a position determining facility, wherein the navigation system interfaces with a data communication facility of an organizer device, said organizer device comprising a facility for storing and managing a personal time and place schedule, wherein there is bi-directional communication of system-operational data between said navigation system and said organizer, said bi-directional communication comprising said navigation system providing said organizer device with actual route data for use in a timetable or diary of said organizer device and comprising said organizer device providing actual diary or timetable data to said navigation system for use in the navigation system's route planning facility.

9. The navigation system of claim 8, wherein said organizer device is physically interfaced to said data communication facility of said organizer device.

10. The navigation system of claim 8, wherein said organizer device is integrated into the navigation system.

11. The navigation system of claim 8, wherein said organizer device interfaces with said navigation system through a wireless interconnection.

12. The navigation system of claim 8, wherein said organizer device is functionally split into a first part that is integrated into the navigation system, and a second part that is connected to the navigation system through an interface that is external relative to said navigation system.

13. A vehicle navigation system comprising a user I/O facility, a route planning facility, and a position determining facility, wherein the navigation system interfaces with a data communication facility of an organizer device, said organizer device comprising a facility for storing and managing a personal time and place schedule, wherein there is bi-directional communication of system-operational data between said navigation system and said organizer, wherein said organizer device provides diary or timetable data to said navigation system for use in the navigation system's route planning facility, and wherein said navigation system provides actual route data to said organizer device for consideration in a timetable or diary context.

14. The navigation system of claim 13, wherein said organizer device is integrated into the navigation system.

15. The navigation system of claim 13, wherein said organizer device is functionally split into a first part that is integrated into the navigation system, and a second part that is connected to the navigation system through an interface that is external relative to said navigation system.

16. A method of operating a vehicle navigation system, comprising:

providing a navigation system in a vehicle, the navigation system comprising at least a route planning facility and a position determining facility;

interfacing an organizer device with the navigation system;

loading data from the organizer into the navigation system, said data comprising actual timetable data or diary data;

calculating a route in the navigation system according to at least the data received from the organizer; and reporting vehicle travel information from the navigation system to the organizer, wherein the vehicle travel information comprises actual route data and wherein the organizer uses the actual route data in a timetable or diary in the organizer device.

17. The method according to claim 16, wherein the organizer is physically interfaced to the navigation system.

18. The method according to claim 16, wherein the organizer is integrated into the navigation system.

19. The method according to claim 16, wherein the organizer is interfaced to the navigation system through a wireless interconnection.

* * * * *